United States Patent
Ambrosy et al.

(10) Patent No.: US 6,255,724 B1
(45) Date of Patent: Jul. 3, 2001

(54) SELF-CENTERING ARRANGEMENT OF MICROSTRUCTURED ELEMENTS

(75) Inventors: Anton Ambrosy, Tiefenbronn; Peter Kersten, Weissach; Sigrun Schneider, Tamm; Antoni Picard, Essenheim; Jörg Reinhardt; Jens Schulze, both of Mainz, all of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/297,042
(22) PCT Filed: Oct. 29, 1997
(86) PCT No.: PCT/EP97/05968
§ 371 Date: Jul. 29, 1999
§ 102(e) Date: Jul. 29, 1999
(87) PCT Pub. No.: WO98/19194
PCT Pub. Date: May 7, 1998

(30) Foreign Application Priority Data

Oct. 29, 1996 (DE) .............................. 196 44 758

(51) Int. Cl.⁷ .......................... H01L 23/02; H01L 23/544
(52) U.S. Cl. .......................... 257/678; 257/797; 257/432; 438/106; 438/121
(58) Field of Search .................... 287/678, 739, 287/797; 438/401, 462, 975, 106, 121; 257/432

(56) References Cited

U.S. PATENT DOCUMENTS

| | | | |
|---|---|---|---|
| 5,227,663 | * 7/1993 | Patil et al. | 257/718 |
| 5,574,628 | * 11/1996 | Persia et al. | 361/737 |
| 5,889,323 | * 3/1999 | Tachibana | 257/704 |
| 6,046,498 | * 4/2000 | Yoshikawa | 257/706 |

* cited by examiner

Primary Examiner—Jhihan B Clark
(74) Attorney, Agent, or Firm—Sughrue, Mion, Zinn, Macpeak & Seas, PLLC

(57) ABSTRACT

The invention relates to a self-centering arrangement of microstructured elements, particularly of microoptical components on a substrate serving as carrier. To provide microoptical components with projections that fit into corresponding recesses is known in the art. The invention provides a way to improve the mutual alignment of components (K1, K2) in that a deformation occurs when projections (Z1, Z2) are inserted into the recesses (A). This deformation may concern the projections or the recesses themselves or a molding material introduced between the projections and the recesses. The deformation improves the self-centering properties; in addition, manufacturing tolerances are more easily compensated. If the element cannot be provided with a suitable projection, an intermediate carrier is used, which is, for example, a plastic element produced by a LIGA process.

17 Claims, 5 Drawing Sheets

SELF-CENTERING ARRANGEMENT OF MICROSTRUCTURED ELEMENTS

BACKGROUND OF THE INVENTION

The invention relates to an arrangement of microstructured elements according to the preamble of claim 1.

In microtechnology, there is the problem of precisely positioning individual, already existing components with respect to each other before securing them. Frequently, for example in microoptics, the permissible tolerances fall within the micrometer or even the submicrometer range. Currently, primarily active adjusting processes are typically used. Active in this connection means that the individual components are brought into their final position during the active operation of the system or subsystem. An example for this is the coupling of a semiconductor laser to an optical fiber. The fiber is shifted until the intensity of the light guided in the fiber reaches a maximum. Active adjustment processes are difficult to automate and therefore expensive. This impedes the continued expansion of microtechnology systems.

In many cases, active adjustment is not possible, or extremely difficult, for technical reasons. Particularly if many components are to be arranged on a small area, there is frequently no space to accommodate adjusting tools in this area to shift the components with micrometer precision. Attempts have therefore been made for some time to use passive adjustment for the individual components. In passively adjusted systems, the outside dimensions of the individual components or subsystems are so exact, or the limit stop edges so precisely executed, that the components can be positioned next to each other, or inserted into each other, to permit immediate optimal operation of the system, i.e., without requiring any further adjustment steps.

Passive adjustment in microtechnology has thus far primarily failed because the components to be positioned are not manufactured with the requisite exactness. As a result, simple positioning together or insertion of components has been successful in only a few special cases. For example, for laser-fiber coupling, spherical lenses on silicon substrates can be inserted in pyramidal recesses produced by anisotropic etching processes. The spherical lenses touch the etched recesses at only four points. Due to their simple geometric shape, spherical lenses can be manufactured very precisely at low cost. Optimizing the etching process has meanwhile also made it possible to produce recesses in silicon, which have the requisite tolerances of a few tenths of a micrometer to make such passive adjustment possible.

Optical fibers, too, can be very precisely positioned on silicon substrates if they are placed in V-shaped etched channels. The optical fibers touch these channels only along two lines and not along an area.

EP 0 638 829 A1 discloses a concept for positioning optical components on a (silicon) substrate. As indicated in FIG. 74, for example, terrace shaped shoulders, onto which the component to be positioned is placed, are etched out of the substrate. As a result, the height of the component In relation to the substrate surface is precisely defined. The lateral alignment of the component is achieved by limit stops on both sides of the component The limit stops are made as surfaces arranged perpendicularly to the substrate surface. Between the limit stops and the component to be inserted, there must be a clearance fit so that the component can still be Inserted. Since It is difficult to insert the component into the gap between the two limit stops, an alternative is proposed where the component is laterally adjusted by means of flip chip bonds. Flip chip bonding, however, requires additional process steps. Furthermore, this technique cannot be used for all components.

SUMMARY OF THE INVENTION

The object of the invention is to define an arrangement by means of which components produced by microtechnology can be mutually aligned in any manner. The arrangement is to be self-centering, i.e., if one component is placed on the other, the two components are automatically to assume their ultimate position. Adjustments of the two components with respect to each other, which do not affect the function of the subassembly, or affect it only to a minor extent, are to be possible if necessary. The arrangement is to eliminate, or at least minimize, active adjustment steps during the positioning of the components.

The invention attains this object in that it provides the components with projections and corresponding recesses. The important thing is that the projections or recesses, or also the connection between the two, are designed in such a way that an (elastic or plastic) deformation occurs when the projections are inserted into the recesses. In one exemplary embodiment of the invention according to claim 2, the projections and for recesses themselves are deformed when the projections are inserted into the recesses. In another embodiment of the invention according to claim 5, a molding material, for example, an adhesive, inserted between projection and recess is deformed. On the one hand this deformation has a self-centering effect. On the other hand minor imperfections in fit, inevitable depending on the manufacturing process, may be compensated.

In a further advantageous concrete embodiment of the Invention according to claim 9, the element is a silicon substrate into which pyramidal or V-shaped recesses are etched. The other element is a plastic component fabricated by a LIGA process, which is essentially provided with wedge shaped projections on its underside. These wedge shaped projections fit Into the corresponding recesses In the silicon substrate. The plastic component has retaining structures on its upper side to receive additional components such as lenses, optical fibers, laser interlocking devices, or guide pins for connector systems. In this case, the plastic component acts as an intermediate carrier, which permits the precise positioning on a silicon carrier of those components whose insertion into the recesses producible by etching is impossible, or very difficult, due to their geometry.

Additional exemplary embodiments of the invention are given in the subclaims.

Below, the invention is explained in detail by means of the exemplary embodiments and the drawings, wherein:

DETAILED DESCRIPTION OF THE INVENTION

Figure 1:
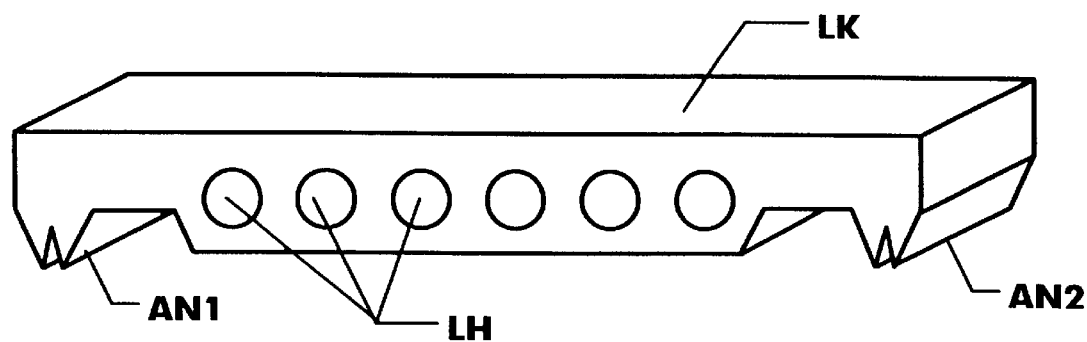
FIG. 1 shows a perspective view of a lens element LK provided with projections AN1 and AN2 according to the invention.
Figure 2:
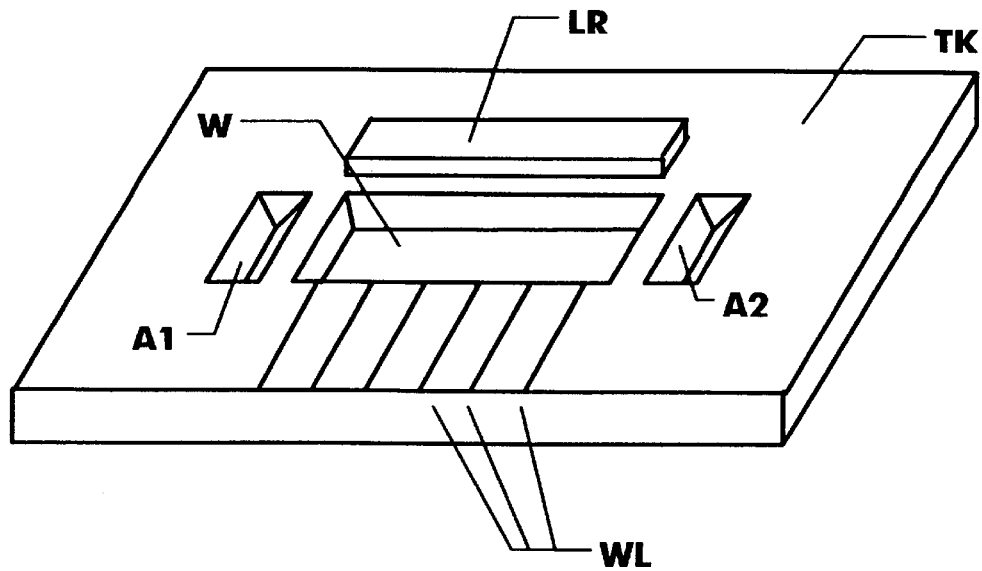
FIG. 2 is a simplified perspective view (different scale from FIG. 1) of a carrier element TK with recesses A1 and A2 for receiving the projections of the lens element.

FIG. 1 and FIG. 2 show a first embodiment of the invention. FIG. 1 shows a lens element developed especially for coupling laser interlocking devices to optical waveguides. The lens element has holes LH into which microlenses are inserted. As an alternative thereto, the lenses can be worked directly out of lens element LK Lens element LK is furthermore provided with two projections AN1 and AN2, the embodiment of which is further explained below.

The lens element in this case is made of a plastic (e.g., PPT, PC, or PPE) and is fabricated by means of a LIGA or injection molding process. Such a process makes it possible to fabricate elements with tolerances of less than one micrometer. Other processes known in microtechnology may also be used to produce lens elements with comparable precision. A modification of the LIGA process, referred to as MIGA process, is described in detail in a paper by R. M üller-Fiedler et al. entitled "Optoelektronische Mikrosysteme," Bosch Technische Berichte, 1994, Volume 56, p. 11–26. Most of these microtechnology processes have the common feature that the dimensions of the element to be produced are determined by lithographic methods. Other processes are known, however, in which the element is machined without a lithographic step by micromilling or microdrilling.

The lens element LK is intended to be inserted into the carrier element TK depicted in FIG. 2. The carrier element in this exemplary embodiment is a silicon substrate. A laser interlocking device LR is fixed to the carrier element by flip chip bonds. In addition, a number of optical waveguide segments WL are mounted on the surface of carrier element TK The optical waveguides may also be replaced by optical fibers guided in V-shaped etched channels. Carrier element TK is provided with two recesses A1 and A2. In the exemplary embodiment, these are V-shaped indentations that are anisotropically etched into a silicon substrate. The etching process is preferably divided into two steps as described in detail, for example, in a paper by A. Ambrosy et al. entitled "Silicon Motherboards for Multichannel Optical Modules," IEEE Transactions on Components, Packaging and Manufacturing Technology—Part A, Vol. 19, No. 1, pp. 34–40. The recesses A1 and A2 can be extended in longitudinal direction such that the lens element LK can be adjusted in this direction, i.e., between the laser interlocking device LR and the waveguide segment WL. Such an adjustment affects the coupling efficiency relatively little, but has the advantage of reducing the requirements for exactness of fit.

The carrier element TK, in addition to recesses A1 and A2, has a trough shaped recess W. The lens element LK partly projects into this trough shaped recess W. This has the result that the optical axes of the lenses in the lens element LK extend just above the surface of the carrier element. The outlet openings of the semiconductor lasers and the inlet openings of the optical waveguides are also typically located at this height. Without lowering the lenses to this level, both the optical waveguides and the laser interlocking device would have to be raised, which would be connected with significant problems.

Figure 3A:
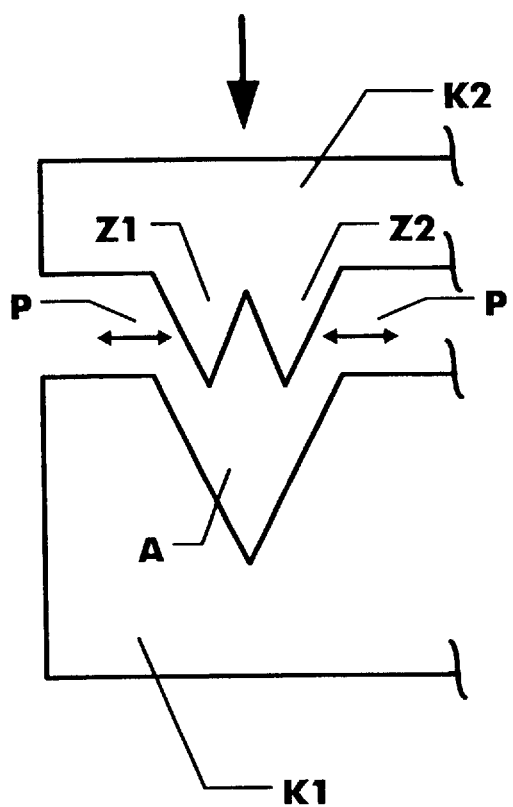
FIG. 3a is a detail drawing of an advantageous embodiment of the invention according to claim 2, state of element K2 before alignment with respect to element K1.

Below, the shape of the projections is discussed in further detail by means of FIG. 3a and FIG. 3b. The depicted projection of element K2 consists of two wedge shaped tongues Z1 and Z2. If the material of element K2 permits it, these tongues can move in the direction of arrow P as shown in FIG. 3a. When the projection formed by the two tongues is inserted into recess A, the rigid sides of recess A exert forces on these tongues such that the tongues yield inwardly. If the material of element K2 is elastic, tongues Z1 and Z2 press against the sides of recess A in the final position of element K2 with respect to element K1. This pressure, which is also maintained in the final position, ensures a particularly dose contact between the surfaces. If element K2 is made of a plastically deformable material, the tongues do not apply a permanent pressure on the sides of the recess. In this case, the tongues conform precisely to the shape of the recess so that even relatively large manufacturing tolerances may be compensated If need be. In either case, the deformabilily of the projections of element K2 results in a tight fit and improves the self-centering properties of the arrangement.

Figure 3B:
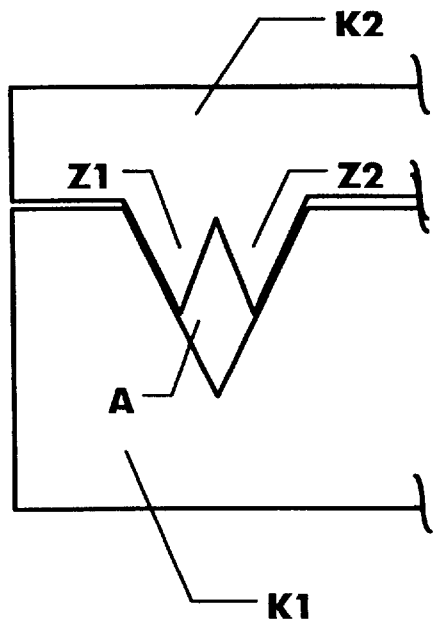
FIG. 3b is a detail drawing of an embodiment according to FIG. 3, element K2 aligned with respect to K1.
Figure 4A:
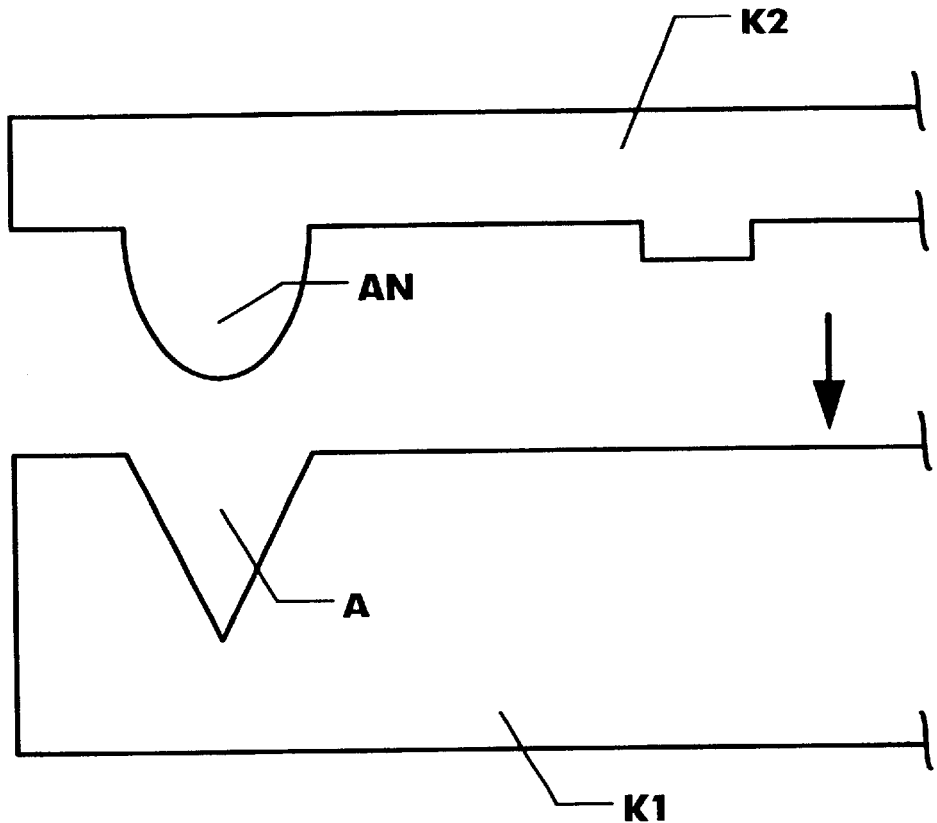
FIG. 4a is a detail drawing of an advantageous embodiment of the invention according to claim 4, state of element K2 before alignment with respect to element K1.
Figure 4B:
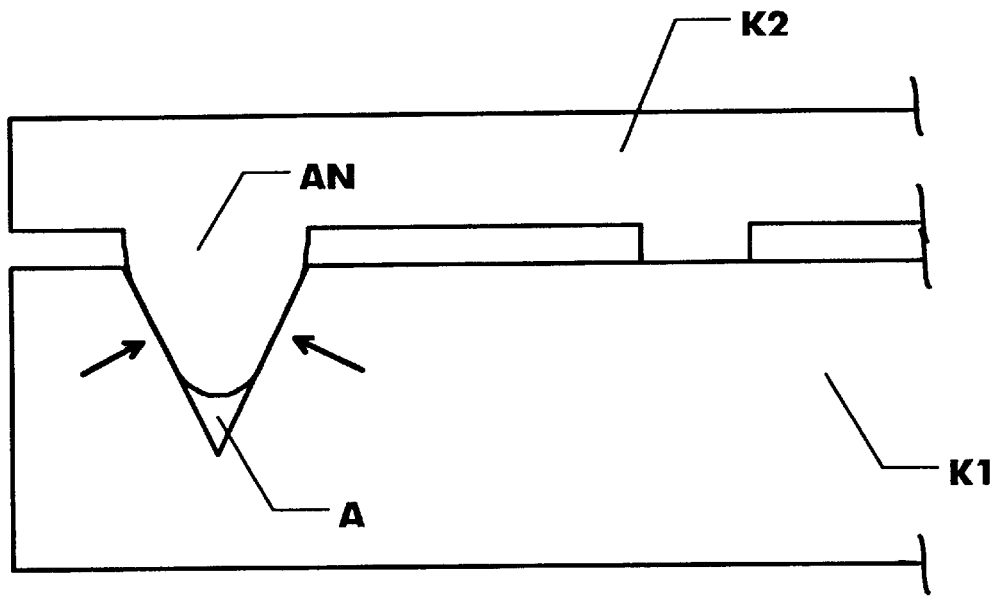
FIG. 4b is a detail drawing of the embodiment according to FIG. 4a, element K2 aligned with respect to element K1.

To permit yielding of the projections, they may be designed as a double tongue as shown in FIG. 3a and 3b. Which shape is the most appropriate for the projections in a concrete individual case to permit yielding depends primarily on the material of the element carrying the projections. For very elastic materials, it may only be necessary to ensure that any material displaced as a result of the deformation has sufficient free space to yield. To create this space, for example, incisions or holes may be provided. FIG. 4a and 4b show an embodiment in which a projection AN, which is made of a deformable material, of an element K2 is inserted into a non-yielding recess A of an element K1. Before insertion, projection AN has a curved boundary surface. Due to the pressure applied by the rigid recess A on projection AN during insertion, projection AN is deformed such that limit stop AN touches recess A along a relatively large area.

As an alterative, or in addition to the deformability of the projections, the recesses may also be designed in such a way that they are plastically or elastically deformed when the projections are inserted. Coming into consideration in this case is less a deformability due to design, but rather one due to material properties. Particularly polymers, depending on the selected manufacturing process, have elastic or plastic properties that permit the embodiment of deformable recesses according to the invention.

Another advantageous exemplary embodiment of the invention provides for insertion of an elastically or plastically deformable molding material such as an adhesive or a polymer between the recesses and the projections. This has two advantages, In particular. On the one hand the molding material fills any gaps due to manufacturing tolerances to ensure a tight fit. In particular, however, this molding material significantly enhances the self-centering properties if the recesses are shaped symmetrically. If the gap between the two bodies Is narrow enough, any viscous material introduced into this gap tends to spread out in a thin, highly uniform film within this gap. This effect, which is probably attributable to surface tensions, is also well known from applications in other areas of technology.

Figure 5:
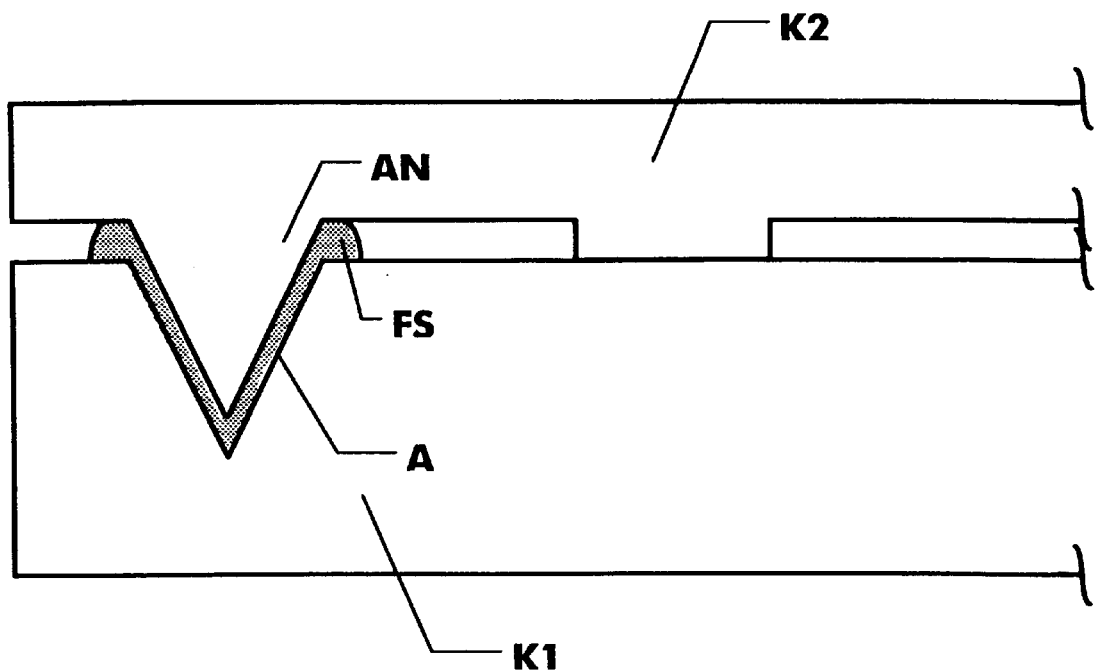
FIG. 5 is a detail drawing of a particularly advantageous embodiment of the invention according to claim 5.

This self-centering process is schematically depicted in FIG. 5. A projection AN of an element K2 protrudes into a symmetrical recess of an element K1. Molding material FS introduced into the recess before insertion is partially displaced by the protruding projection AN such that a thin film is produced between recess and projection AN. Since the film tends to assume a uniform thickness, the projection is centered very precisely with respect to the recess, as may be clearly seen In FIG. 5. The projections may also be coated with a film having the desired elastic or plastic properties. It is particularly advantageous to use an adhesive as molding material. The adhesive has plastic or also elastic properties and thus supports self-centering. However, foils or silicon, for example, may also be used as molding materials.

Below, additional variants of the invention are described to show the broad application possibilities and many advantages of the invention. In a particularly advantageous embodiment of the invention according to claim 7, the projection and recess arrangement is used to fix the element to be mounted with respect to the carrying element only horizontally, i.e., parallel to the surface of the carrying element The vertical position is defined by suitably designed limit stops.

Figure 6:
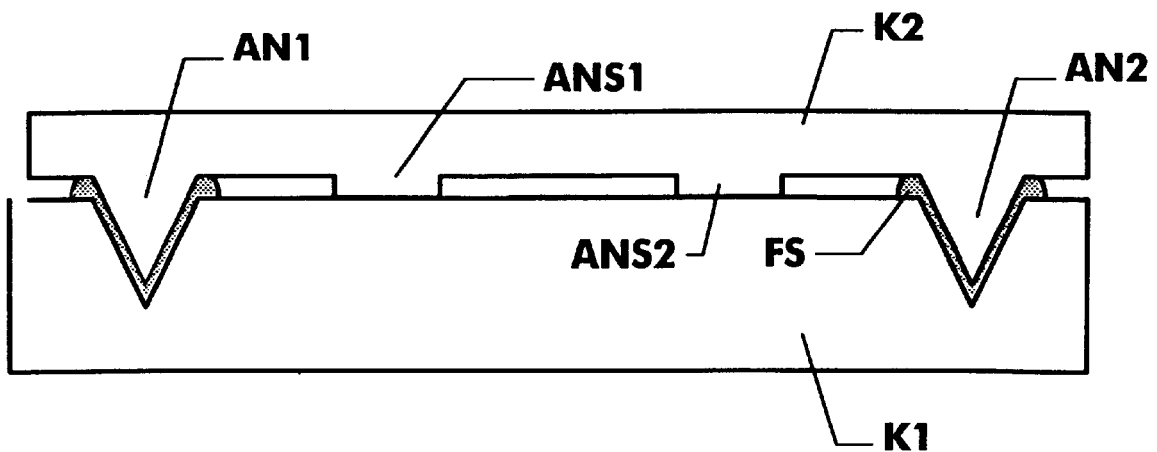
FIG. 6 is an overview of the embodiment shown in FIG. 5.

FIG. 6 is an overview of the exemplary embodiment shown in FIG. 5. Projections AN1 and AN2 protrude into the corresponding recesses of the carrying element K1. Since in this case, a molding material is again introduced between the projections and the recesses, element K2 Initially does not solidly rest on element K1 such that the vertical position of the elements with respect to each other is not exactly determined. To permit a precise definition of the vertical alignment as well, element K2 is provided with two limit stops ANS1 and ANS2. These limit stops rest on element K1. The distance between the two elements is thus precisely defined. In this embodiment, the symmetrical arrangement of the projections or recesses makes it possible precisely to center the mounted element K2 with respect to the carrier element K1 even if manufacturing tolerances are relatively large.

Figure 7:
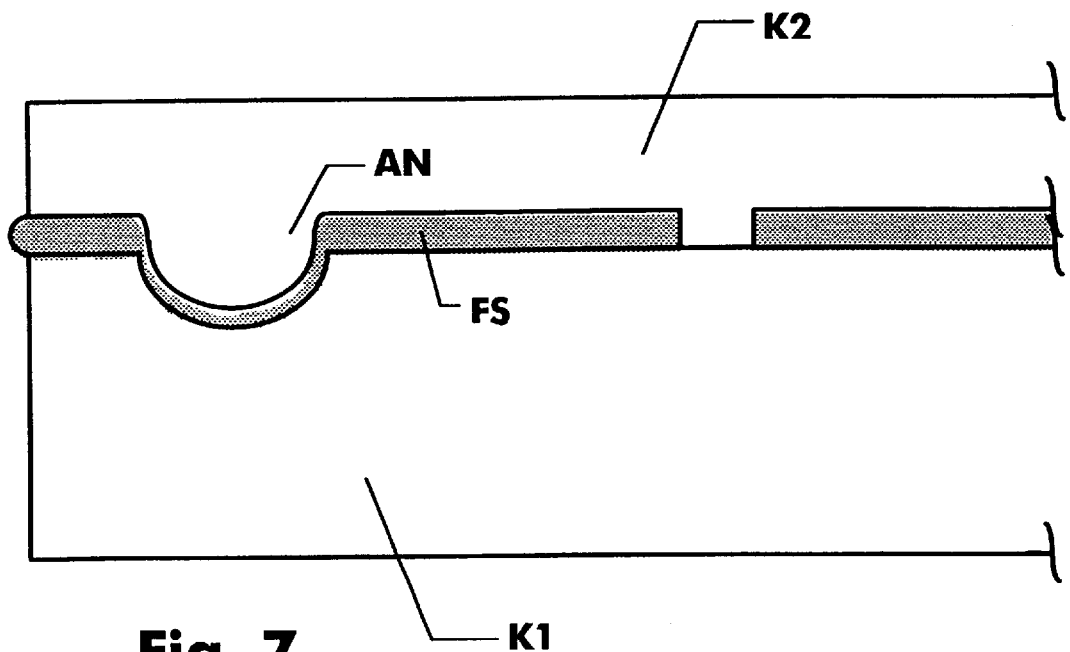
FIG. 7 is a detail drawing of an advantageous embodiment of the invention according to claim 8.

Depending on the material of the element and the processing technique used, it may be useful to provide the projections and recesses of the elements not with flat but with curved surfaces. In ceramics, for example, micromilling may be used to create recesses having the shape of a spherical segment. This is depicted in a lateral section in FIG. 7.

It is also feasible to provide the carrying element not with recesses but with projections. The mounted element correspondingly does not have projections but recesses. An element may also be provided with both projections and recesses.

Figure 8:
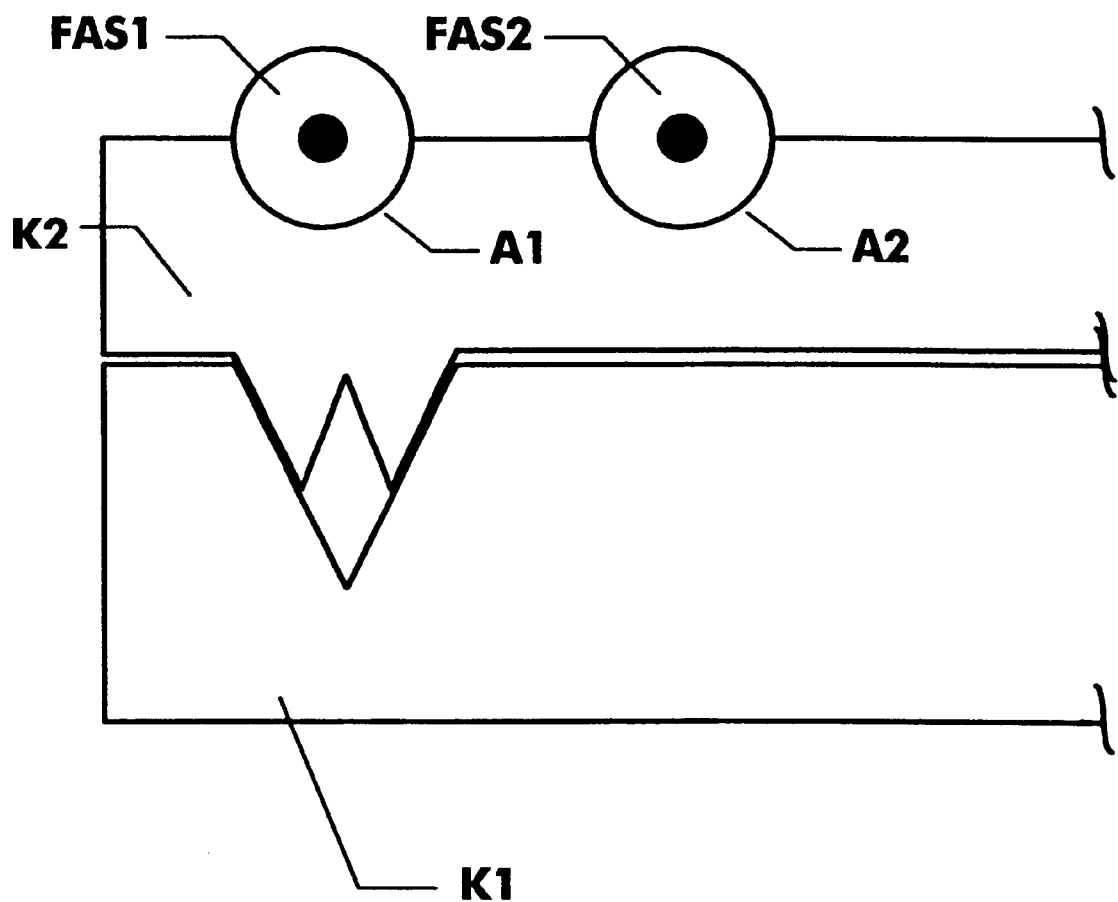
FIG. 8 is a detail drawing of an advantageous embodiment of the invention according to claim 10.

A particularly advantageous embodiment of the invention provides that an intermediate carrier made, for example, of silicon or a ceramic, be mounted according to the invention on a stable carrier. For this purpose, the underside of the intermediate carrier is provided with inventive projections, which are inserted into corresponding recesses in the stable carrier. The upper side of the intermediate carrier is provided with positioning structures serving for the exact positioning of additional components. These additional components can be, for example, mechanical, optical, electrical, or fluidic microstructures. FIG. 8 shows an intermediate carrier K2 mounted on a carrier K1. The upper side of the intermediate carrier is provided with recesses for receiving, in this example, optical fibers FAS1 and FAS2. The intermediate carrier K2 in this case is made of an elastically or plastically deformable material, which yields when the comparatively hard optical fibers FAS1 and FAS2 are inserted into the corresponding recesses A1 and A2. The Intermediate carrier K2 thus functions as a kind of mounting platform for additional components.

The intermediate carrier permits a very precise alignment of even those components whose positioning and fixation on conventional semiconductor and ceramic carriers would otherwise be impossible or very difficult. For example, if cuboid components are to be passively adjusted, the corresponding recesses in the carrier should advantageously also be cuboid. Such cuboid recesses, however, cannot be produced with the necessary precision for passive adjustment in conventional carriers. By interposing an intermediate carrier, even cuboid components can be positioned reliably and very precisely since the fabrication of cuboid recesses, for example, in plastic, by means of LIGA or related processes [incomplete sentence]

What is claimed is:

1. A self-centering arrangement comprising two mutually microstructured elements (LK;TK;K1,K2), wherein one of the two elements (LK;K2) has a projection (AN1,AN2;AN) and the other element (TK;K1) has a recess(A1,A2;A), into which the projection of the one element protrudes, and wherein a deformable means enables the mutual alignment of the microstructured elements.

2. Arrangement according to claim 1, in which the deformable means is the projection (AN1, AN2; AN in FIG. 4a; Z1, Z2) or the recess.

3. Arrangement according to claim 1, in which the deformability of the means (AN1, AN2; Z1, Z2) is based on its spatial form.

4. Arrangement according to claim 1, in which the deformability of the means is based on its material properties (AN in FIG. 4a).

5. Arrangement according to claim 1, in which the deformable means is a molding material (FS) introduced between the projection (AN in FIG. 5) and the recess (A).

6. Arrangement according to one claim 1, in which the distance between the two elements (K1, K2 in FIG. 6) is defined by a limit stop (ANS1, ANS2), which is not deformable.

7. Arrangement according to claim 1, in which the projection (AN in FIG. 7) and/or the recess (A) have an at least partially curved boundary surface.

8. Arrangement according to claim 1, in which one of the two elements (LK in FIG. 1) is made of a plastic or a photo structurable glass and has at least one curved surface such that this element acts as a lens for a light beam passing through this curved surface.

9. Arrangement according to claim 1, in which at least one third element (FAS1, FAS2) having an optical, mechanical, electrical, or fluidic function is attached to one of the two elements (K2 In FIG. 8).

10. Arrangement according to claim 5, in which the molding material is an adhesive.

11. A self-centering microstructure arrangement comprising:
    a first microstructure element having a deformable projection located in a predetermined position thereon; and
    a second microstructure element upon which said first mircostructure element is to be positioned, said second microstructure element having a recess located in a predetermined position thereon, for receiving said deformable projection of said first microstructure element, wherein self-centering of said first microstructure on said second microstructure is enabled by deforming said deformable projection during insertion into said recess wherein said deformable projection comprises a wedge-shaped double tongue structure, and wherein said recess deforms said deformable projection by compressing the wedge-shaped double tongue structure.

12. The self-centering microstructure arrangement according to claim 11, wherein said deformable projection comprises a projection made of deformable material having a different shaped as compared to a shape of said recess, and wherein said projection substantially conforms to a shape of said recess during insertion of said deformable projection into said recess.

13. The self-centering microstructure arrangement according to claim 12, further comprising a limit stop disposed on a surface of one of said first and second microstructure elements, said limit stop limiting a depth of which said deformable projection can be inserted into said recess.

14. A self-centering microstructure arrangement comprising:
a first microstructure element having a projection located in a predetermined position thereon;
a second microstructure element upon which said first mircostructure element is to be positioned, said second microstructure element having a recess located in a predetermined position thereon, for receiving said projection of said first microstructure element; and
molding material disposed between said projection and said recess, said molding material enabling self-centering of said first microstructure on said second microstructure by deforming between opposing surfaces of said projection and said recess during insertion of said projection into said recess.

15. The self-centering microstructure arrangement according to claim 14, wherein said molding material is a material selected from the group of adhesive, foil and silicon.

16. The self-centering microstructure arrangement according to claim 11, wherein said first microstructure element comprises a lens element for an optical device, and wherein said second microstructure element comprises a carrier element having an optical pathway to interact with said lens element when said lens element is positioned on said carrier element.

17. The self-centering microstructure arrangement according to claim 11, wherein said first microstructure element is an intermediate carrier having a positioning recess for precise positioning of at least one of a mechanical, an optical, an electrical, and a fluidic microstructure.

* * * * *